(No Model.)

D. O'LEARY.
LID HOLDER.

No. 493,834. Patented Mar. 21, 1893.

Witnesses
C. A. Ford.
H. F. Riley.

Inventor
D. O'Leary.
By his Attorneys,
C. A. Snow & Co.

THE NORRIS PETERS CO., PHOTO-LITHO., WASHINGTON, D. C.

UNITED STATES PATENT OFFICE.

DENNIS O'LEARY, OF WINCHESTER, CALIFORNIA.

LID-HOLDER.

SPECIFICATION forming part of Letters Patent No. 493,834, dated March 21, 1893.

Application filed September 21, 1892. Serial No. 446,426. (No model.)

*To all whom it may concern:*

Be it known that I, DENNIS O'LEARY, a citizen of the United States, residing at Winchester, in the county of San Diego and State of California, have invented a new and useful Lid-Holder, of which the following is a specification.

The invention relates to improvements in lid holders.

The object of the present invention is to provide a simple and inexpensive device adapted to be readily applied to a kettle or other similar culinary vessel and capable of hinging the lid or cover to the body of the vessel and of maintaining the lid in any desired adjustment or open or closed and also of holding the handle up from the body of the kettle to prevent the handle becoming heated.

The invention consists in the construction and novel combination and arrangement of parts hereinafter fully described, illustrated in the accompanying drawings and pointed out in the claims hereto appended.

Figure 1:
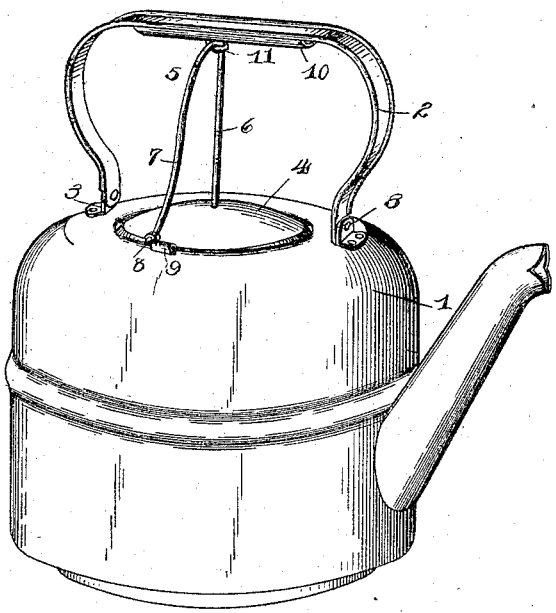
Figure 4:
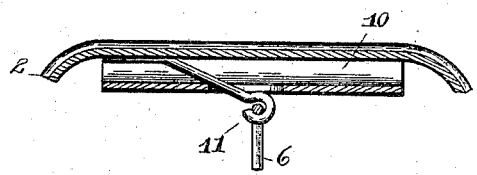
Figure 2:
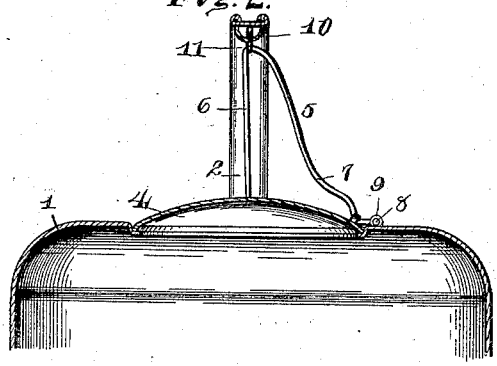
Figure 3:
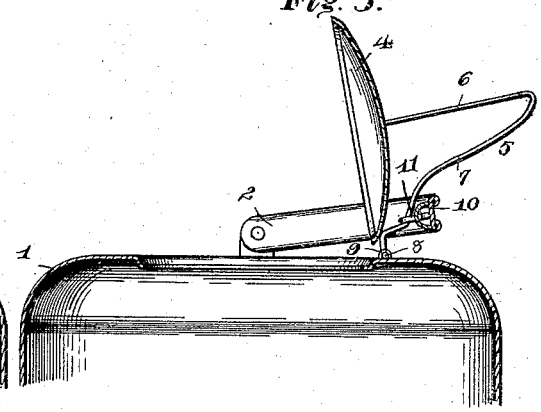

In the drawings,—Figure 1 is a perspective view of a kettle provided with my improvement. Fig. 2 is a vertical sectional view, the lid being closed and the handle being in a vertical position. Fig. 3 is a similar view the lid being open. Fig. 4 is a detail sectional view of the handle, showing the resilient hook.

Like numerals of reference designate corresponding parts in all the figures of the drawings.

1 desigates a kettle having a handle or bail 2, hinged to ears 3, disposed on opposite sides of a cover opening over which is arranged a lid or cover 4. An inverted V-shaped loop 5 constructed of wire has its front arm 6 secured at its lower end to the center of the lid and its rear arm 7 is slightly sigmoidally curved and secured at its lower end to the rear edge of the lid and provided with an L-shaped pintle extension 8 engaging an eye 9 of the body whereby the latter is hingedly connected with the lid. The bail or handle is provided on its cross piece or handle proper with a sleeve 10 having a central opening through which projects an open eye or hook 11 of a resilient hook the shank of which is located within the sleeve; and the said resilient or spring hook is adapted to be sprung out of engagement with the curved arm of the inverted V-shaped loop. In swinging the handle up or down the open eye or hook 11 thereof, causes the cover to be raised or lowered thereby enabling the lid or cover to be held at any desired elevation or either fully closed or open, and the handle or bail is also maintained in a vertical position or when the lid or cover is open at a point slightly above the body of the kettle so that the hand of a person may be readily interposed between the handle or bail or the body and also prevent the handle becoming heated. The V-shaped loop hinges the lid to the body and also detachably secures the lid in place as the hook 11 may be sprung out of engagement with the curved arm and the pintle extension may then be disengaged from the eye.

It will be seen that the device is simple and inexpensive in construction, that it is adapted to hold the lid and handle as desired and that it hinges and detachably secures the lid to the body.

When the handle is in an upright position as illustrated in Figs. 1 and 2 of the accompanying drawings it locks the lid in place on the kettle.

What I claim is—

1. The combination with a kettle provided with a hinged handle, and a cover, of an eye arranged on the body, a spring hook secured to the handle and an inverted V-shaped loop secured to the cover and extending upward therefrom and having its rear arm curved and engaged by the hook and provided at its lower end with a pintle extension arranged in said eye and detachably hinging the cover to the body, substantially as described.

2. The combination with a kettle provided with a hinged handle, and a cover, of a spring hook secured to the handle and an inverted V-shaped loop secured to the cover and extending upward therefrom and having its rear arm curved and engaged by the hook when raised the handle being adapted to lock the lid in its closed position, substantially as described.

In testimony that I claim the foregoing as my own I have hereto affixed my signature in the presence of two witnesses.

DENNIS O'LEARY.

Witnesses:
FRED. S. BYNON,
JOHN PATTERSON.